United States Patent
Oren

(10) Patent No.: US 9,736,274 B2
(45) Date of Patent: Aug. 15, 2017

(54) RADIO OVER ETHERNET MAPPER PHYSICAL LAYER DEVICE (PHY)

(71) Applicant: Avago Technologies General IP (Singapore) Pte. Ltd., Singapore (SG)

(72) Inventor: Amit Oren, Los Altos Hills, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 295 days.

(21) Appl. No.: 14/542,027

(22) Filed: Nov. 14, 2014

(65) Prior Publication Data

US 2015/0131643 A1    May 14, 2015

Related U.S. Application Data

(60) Provisional application No. 61/904,303, filed on Nov. 14, 2013.

(51) Int. Cl.
    *H04L 29/06*  (2006.01)
    *H04J 3/06*   (2006.01)

(52) U.S. Cl.
    CPC ............ *H04L 69/08* (2013.01); *H04J 3/0697* (2013.01); *H04L 69/22* (2013.01); *H04J 3/0661* (2013.01)

(58) Field of Classification Search
    None
    See application file for complete search history.

(56) References Cited

U.S. PATENT DOCUMENTS

2012/0113972 A1*   5/2012   Liu .................... H04W 88/085
                                                                370/338

* cited by examiner

*Primary Examiner* — Kwang B Yao
*Assistant Examiner* — Adam Duda
(74) *Attorney, Agent, or Firm* — Sterne, Kessler, Goldstein & Fox P.L.L.C.

(57) ABSTRACT

A mapper physical layer device (PHY) is disclosed that performs a protocol conversion of an input data stream that is formatted according to a first wired communication protocol to provide an output data stream that is formatted according to a second wired communication protocol. The mapper PHY can be synchronized to a common reference clock or clocking source to ensure that data streams provided by multiple mapper PHYs are sufficiently aligned to satisfy frame timing alignment accuracy requirements of a wireless communication protocol.

21 Claims, 3 Drawing Sheets

RADIO OVER ETHERNET MAPPER PHYSICAL LAYER DEVICE (PHY)

CROSS-REFERENCE TO RELATED APPLICATIONS

This patent application claims the benefit of U.S. Provisional Patent Application No. 61/904,303, filed Nov. 14, 2013, which is incorporated herein by reference in its entirety.

BACKGROUND

Field of Disclosure

The present disclosure generally relates to protocol conversion in an electronic system and including a protocol conversion of an input data stream that is formatted according to a first wired communication protocol to provide an output data stream that is formatted according to a second wired communication protocol.

Related Art

A cellular network, also referred to as a mobile network, represents a radio network distributed over various geographic areas called cells, each cell being served by at least one base station or access point. The base station provides cellular communication to one or more mobile communication devices, such as one or more cellular phones to provide an example, within its geographic area of coverage. The base station can provide coverage over a wide geographic area, such as a few kilometers, to form a macrocell or coverage over smaller geographic areas to form a small cell, such as microcell which is less than two kilometers wide, a picocell which is 200 meters or less wide, or a femotcell which is on the order of 10 meters. The base station typically includes one or more outdoor units (ODUs), each including one or more radio units, which are positioned at a physically high point of a cellular tower or other structure for communication with the one or more mobile communication devices. The one or more ODUs are electrically connected to an indoor unit (IDU), which includes a baseband processor, for processing of signals communicated between the base station and the one or more mobile communication devices.

In the base station, the baseband processor and the one or more radio units communicate with one another via one or more communication link interfaces. For example, the Common Public Radio Interface (CPRI) provides a standardization for the one or more communication link interfaces to connect Radio Equipment Control (REC), such as the baseband processor to provide an example, and Radio Equipment (RE), such as the one or more radio units to provide an example. The CPRI is described in detail in "Common Public Radio Interface (CPRI)—Interface Specification, Version 6.0," published Aug. 30, 2013, which is incorporated by reference in its entirety. Alternatively, the one or more communication link interfaces may be established utilizing the Open Base Station Architecture Initiative (OBSAI). OBSAI is described in detail in "Open Base Station Architecture Initiative—BTS System Reference Document, Version 2.0," and "Open Base Station Architecture Initiative—Reference Point 4 Specification, Version 1.1," both of which are incorporated by reference in their entirety.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears.

The present disclosure will now be described with reference to the accompanying drawings.

DETAILED DESCRIPTION OF THE DISCLOSURE

Overview

A mapper physical layer device (PHY) is disclosed that performs a protocol conversion of an input data stream that is formatted according to a first wired communication protocol to provide an output data stream that is formatted according to a second wired communication protocol. The mapper PHY can be synchronized to a common reference clock or clocking source to ensure that data streams provided by multiple mapper PHYs are sufficiently aligned to satisfy frame timing alignment accuracy requirements of a wireless communication protocol.

Mapper Physical Layer Device (PHY)

Figure 1:
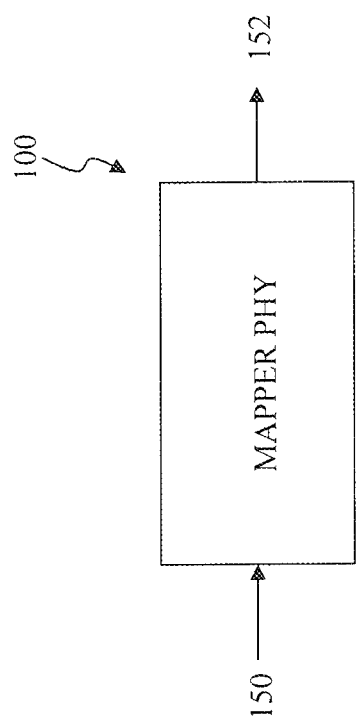
FIG. 1 illustrates a block diagram of a mapper physical layer device (PHY) according to an exemplary embodiment of the present disclosure.

FIG. 1 illustrates a block diagram of a mapper PHY according to an exemplary embodiment of the present disclosure. A mapper PHY 100 performs a protocol conversion of an input data stream 150 that is formatted according to a first wired communication protocol to provide an output data stream 152 that is formatted according to a second wired communication protocol. In an exemplary embodiment, the first wired communication protocol and/or the second wired communication protocol include wired communication protocols or standards such as CPRI, OBSAI, and/or an Ethernet communication protocol, such as Institute of Electrical and Electronics Engineers (I.E.E.E.) 802.3, or any other suitable wired communication protocol that will be apparent to those skilled in the relevant art(s) without departing from the spirit and scope of the present disclosure.

The input data stream 150 can include a first header portion and a first payload portion that are defined in accordance with the first wired communication protocol. The protocol conversion performed by the mapper PHY 100 includes decapsulation of the input data stream 150 into the first header portion and the first payload portion. The mapper PHY 100 can optionally store or buffer the first header portion and the first payload portion. Thereafter, the mapper PHY 100 encapsulates, also referred to as frames, the first header portion and/or the first payload portion into a second header portion and a second payload portion that is complaint with the second wired communication protocol to provide the output data stream 152. In another exemplary embodiment, the input data stream 150 can represent a serial data stream. In this exemplary embodiment, the mapper PHY 100 can convert this serial data stream into a parallel data stream before decapsulating the input data stream 150. Afterwards, in this exemplary embodiment, the mapper PHY 100 can convert the second header portion and the second payload portion from a parallel data stream into a serial data stream to provide the output data stream 152.

Exemplary Configuration and Arrangement for the Mapper PHY

Figure 2:
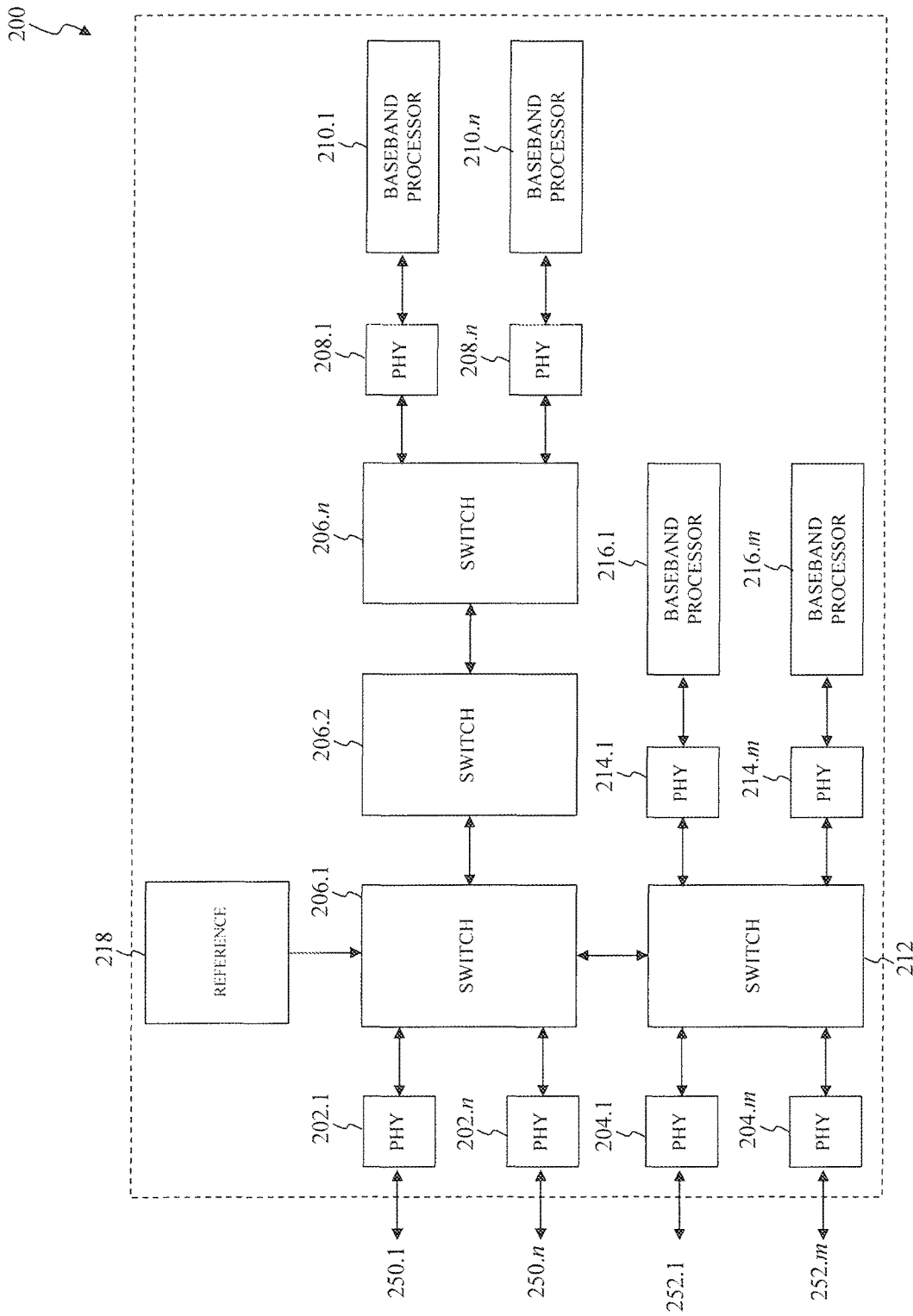
FIG. 2 illustrates a baseband processing device having multiple mapper PHYs according to an exemplary embodiment of the present disclosure.

FIG. 2 illustrates a baseband processing device having multiple mapper PHYs according to an exemplary embodiment of the present disclosure. A baseband processing device 200 includes multiple mapper PHYs, such as multiple mapper PHYs 100 to provide an example, that are synchronized to a common reference clock or clocking source to ensure that data streams provided by the multiple mapper PHYs are sufficiently aligned to satisfy frame timing alignment accuracy requirements of a wireless communication protocol, such as the Third Generation Partnership Project (3GPP) communication protocol, the Worldwide Interoperability for Microwave Access (WiMAX) communication protocol, the Long-Term Evolution (LTE) communication protocol, the Global System for Mobile Communications (GSM) communication protocol to provide some examples. The baseband processing device 200 can be implemented as a standalone or a discrete device or may be incorporated within or coupled to another electrical device or host device such as a base station, a Cloud Radio Access Network (C-RAN or Cloud RAN), or a CPRI aggregation system to provide some examples. As illustrated in FIG. 2, the baseband processing device 200 can include mapper PHYs 202.1 through 202.n, mapper PHYs 204.1 through 204.m, switches 206.1 through 206.n, mapper PHYs 208.1 through 208.n, baseband processors 210.1 through 210.n, an switch 212, mapper PHYs 214.1 through 214.n, baseband processors 216.1 through 216.m, and a reference module 218.

As further illustrated in FIG. 2, the mapper PHYs 202.1 through 202.n, the switches 206.1 through 206.n, mapper PHYs 208.1 through 208.n, the baseband processors 210.1 through 210.n represent a first service processing branch of the baseband processing device 200. The mapper PHYs 204.1 through 204.m, the switch 212, the mapper PHYs 214.1 through 214.n, and the baseband processors 216.1 through 216.m represent a second service processing branch of the baseband processing device 200. The reference module 218 provides a common reference clock or clocking source that is distributed throughout the first service processing branch and the second service processing branch. Although FIG. 2 illustrates the baseband processing device 200 as including the first service processing branch and the second service processing branch, this is for illustrative purposes only. Those skilled in the relevant art(s) will recognize that the baseband processing device 200 can include other service processing branches having different configuration and arrangements of mapper PHYs, switches, and/or baseband processors without departing from the spirit and scope of the present disclosure.

The first service processing branch connects the baseband processing device 200 to a first remote radio head (RRH), or first group of RHHs, (not shown in FIG. 2). Each of the mapper PHYs 202.1 through 202.n transmit and/or receive a corresponding data stream from among data streams 250.1 through 250.n. The mapper PHYs 202.1 through 202.n can perform a first protocol conversion of signals provided by the switch 206.1 that are formatted according to the first wired communication protocol, such as Ethernet, to provide the data streams 250.1 through 250.n that are formatted according to the second wired communication protocol, such as CPRI. The mapper PHYs 202.1 through 202.n perform a second protocol conversion of the data streams 250.1 through 250.n that are formatted according to the second wired communication protocol to provide signals to the switch 206.1 that are formatted according to the first wired communication protocol. The switches 206.1 through 206.n route signals from the mapper PHYs 202.1 through 202.n to the mapper PHYs 208.1 through 208.n, as well as to other devices such as other processing devices, other communication devices and/or the second service processing branch, according to the first wired communication protocol. The mapper PHYs 208.1 through 208.n can perform the first protocol conversion of signals provided by the switch 206.n that are formatted according to the first wired communication protocol to provide signals to the baseband processors 210.1 through 210.n. The mapper PHYs 202.1 through 202.n perform the second protocol conversion of signals from the baseband processors 210.1 through 210.n that are formatted according to the second wired communication protocol to provide signals to the switch 206.n that are formatted according to the first wired communication protocol.

The second service processing branch connects the baseband processing device 200 to a second RRH, or a second group of RRHs, (not shown in FIG. 2). Each of the mapper PHYs 204.1 through 204.m transmit and/or receive a corresponding data stream from among data streams 252.1 through 252.m. The mapper PHYs 204.1 through 204.m can perform the first protocol conversion of signals provided by the switch 212.1 that are formatted according to the first wired communication protocol, such as Ethernet, to provide the data streams 252.1 through 252.m that are formatted according to the second wired communication protocol, such as CPRI. The mapper PHYs 204.1 through 204.m perform the second protocol conversion of the data streams 252.1 through 252.m that are formatted according to the second wired communication protocol to provide signals to the switch 212 that are formatted according to the first wired communication protocol. The switch 212 routes signals from the mapper PHYs 204.1 through 204.m to the mapper PHYs 214.1 through 214.m, as well as to other devices such as other processing devices, other communication devices and/or the first service processing branch, according to the first wired communication protocol. The mapper PHYs 214.1 through 214.m can perform the first protocol conversion of signals provided by the switch 212 that are formatted according to Ethernet to provide signals to the baseband processors 216.1 through 216.m. The mapper PHYs 204.1 through 204.m perform the second protocol conversion of signals from the baseband processors 216.1 through 216.m that are formatted according to the second wired communication protocol to provide signals to the switch 212 that are formatted according to the first wired communication protocol.

The reference module 218 provides a common reference clock or clocking source to ensure that the data streams 250.1 through 250.n and the data streams 252.1 through 252.m provided by the mapper PHYs 202.1 through 202.n and the mapper PHYs 204.1 through 204.m, respectively, are sufficiently aligned to satisfy frame timing alignment accuracy requirements of a wireless communication protocol, such as the 3GPP communication protocol, the WiMAX communication protocol, the LTE communication protocol, and/or the GSM communication protocol to provide some examples. In an exemplary embodiment, this common reference clock or clocking source is distributed throughout the baseband processing device 200 by the switch 206.1; however, other manners of distribution are possible that will be apparent to those skilled in the relevant art(s) without departing from the spirit and scope of the present disclosure. In another exemplary embodiment, this common reference clock or clocking source is distributed throughout the Cloud RAN according to a Precision Time Protocol (PTP) such as I.E.E.E. 1588 to provide an example. In this other exemplary embodiment, the first service processing branch and the second service processing branch can synchronize to a Time of Day (ToD) reference as provided by I.E.E.E. 1588.

Exemplary Mapper PHY

Figure 3:
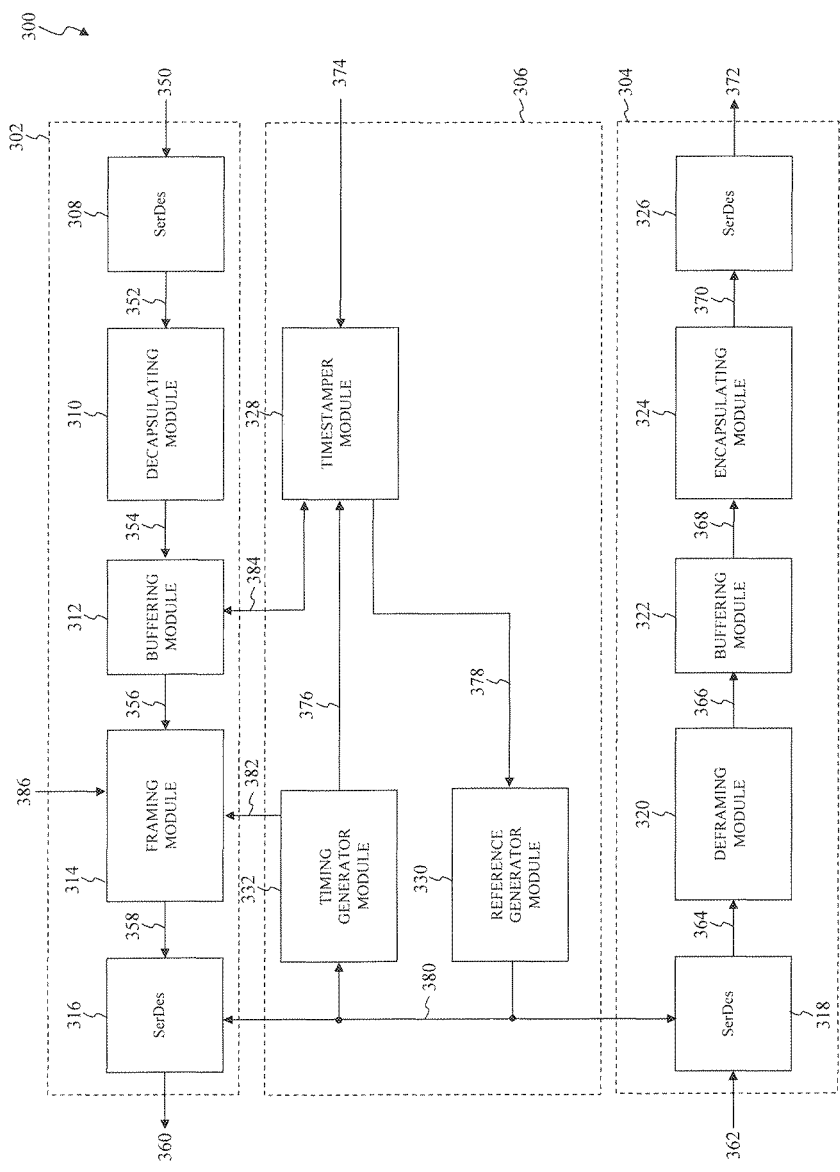
FIG. 3 illustrates a block diagram of an exemplary configuration of the mapper PHY according to an exemplary embodiment of the present disclosure.

FIG. 3 illustrates a block diagram of an exemplary configuration of the mapper PHY according to an exemplary embodiment of the present disclosure. A mapper PHY 300 performs a protocol conversion of one or more input data streams that are formatted according to a first wired communication protocol, such as Ethernet to provide an example, to provide one or more output data streams that are formatted according to a second wired communication protocol, such as CPRI or OBSAI to provide some examples. As illustrated in FIG. 3, the mapper PHY 300 includes a transmission module 302, a reception module 304, and a clocking module 306. The mapper PHY 300 can represent an exemplary embodiment of the mapper PHY 100.

The transmission module 302 performs a protocol conversion of a serial input data stream 350 that is formatted according to the first wired communication protocol to provide a serial output data stream 360 that is formatted according to the second wired communication protocol. Although only a single serial input data stream 350 and a single serial output data stream 360 are illustrated in FIG. 3, those skilled in the relevant art(s) will recognize that multiple serial input data streams 350 can be converted by the transmission module 302 to provide multiple serial output data streams 360 in a substantially similar manner as to be described below without departing from the spirit and scope of the present disclosure. In exemplary embodiment, the serial output data stream 360 represents a constant, or near substantially constant, bit rate serial data stream. The transmission module 302 includes a first Serializer/Deserializer (SerDes) module 308, a decapsulating module 310, a first buffering module 312, a first framing module 314, and a second SerDes module 316.

The first SerDes module 308 receives the serial input data stream 350 which typically represents a serial data stream that is received from another electrical or host device, such as the switches 206.1 through 206.*n* or the switch 212 to provide some examples, and is formatted in accordance with the first wired communication protocol. The first SerDes module 308 can convert the serial input data stream 350 into a parallel data stream to provide a parallel input data stream 352. The parallel input data stream 352 can represent multiple data packets having first header portions and first payload portions that are defined in accordance with the first wired communication protocol, such as Ethernet to provide an example.

The decapsulating module 310 separates the parallel input data stream 352 into the first payload portions 354 and the first header portions and writes the first payload portions 354 into corresponding addresses of the first buffering module 312. The corresponding addresses for the first payload portions 354 are based on their positions in the serial input data stream 350 as determined by their corresponding first header portions. In an exemplary embodiment, the decapsulating module 310 writes the first payload portions 354 in a random access manner; however, a First In, First Out (FIFO) manner is possible. The decapsulating module 310 can optionally be bypassed to support a transparent mode where the serial input data stream 350 is provided as the serial output data stream 360.

The first framing module 314 reads a frame of stored first payload portions 356 from the first buffering module 312 from their corresponding addresses of the first buffering module 312 to provide second payload portions for a parallel output data stream 358. The frame includes a number of bits that are read from the first buffering module 312 as defined by the second wired communication protocol. The number of bits of the stored first payload portions 356 is typically dependent upon the second wired communication protocol; however, the stored first payload portions 356 can have the same number of bits as their corresponding first payload portions 354. The parallel output data stream 358 represents multiple data packets having second header portions and second payload portions that are defined in accordance with the second wired communication protocol, such as CPRI to provide an example. Thereafter, the first framing module 314 generates and appends the second header portions to their corresponding second payload portions according to the second wired communication protocol to provide the parallel output data stream 358. Additionally, the first framing module 314 can include various control and/or management information 386 within the second header portions of the parallel output data stream 358. For example, CPRI supports various control and management channels such as a fast control and management channel, a slow control and management channel, a layer 1 inband protocol channel, a vendor specific control and management channel, and a synchronization control and management channel. Each of these control and management channels is defined by a version of CPRI, such the "Common Public Radio Interface (CPRI); Interface Specification V1.4" (May 3, 2006), which is incorporated by reference in its entirety.

The second SerDes module 316 can convert the parallel output data stream 358 into a serial data stream to provide the serial output data stream 360.

The reception module 304 performs a protocol conversion of a serial input data stream 362 that is formatted according to the second wired communication protocol to provide a serial output data stream 372 that is formatted according to the first wired communication protocol. Although only a single serial input data stream 362 and single serial output data stream 372 are illustrated in FIG. 3, those skilled in the relevant art(s) will recognize that multiple serial input data streams 362 can be converted by the reception module 304 to provide multiple serial output data streams 372 in a substantially similar manner as to be described below without departing from the spirit and scope of the present disclosure. The reception module 304 includes a third SerDes module 318, a deframing module 320, a second buffering module 322, an encapsulating module 324, and a fourth SerDes module 326.

The third SerDes module 318 receives the serial input data stream 362 which typically represents a serial data stream that is received from a remote radio head (RRH) and is formatted in accordance with the second wired communication protocol. The third SerDes module 318 can convert the serial input data stream 362 into a parallel data stream to provide a parallel input data stream 364. The parallel input data stream 364 can represent multiple data packets having first header portions and first payload portions that are defined in accordance with the first wired communication protocol.

The deframing module 320 separates the parallel input data stream 362 into the first payload portions 366 and the first header portions and writes the first payload portions 366 into corresponding addresses of the second buffering module 322. The corresponding addresses for the first payload portions 366 are based on their positions in the serial input data stream 362 as determined by their corresponding first header portions. In an exemplary embodiment, the deframing module 320 writes the first payload portions 366 in a random access manner; however, a First In, First Out (FIFO) manner is possible.

The encapsulating module 324 reads stored a frame of second payload portions 368 from the second buffering module 332 from their corresponding addresses of the second buffering module 322 to provide second payload portions for a parallel output data stream 370. The frame includes a number of bits that be read from second buffering module 332 as defined by the first wired communication protocol. The number of bits within the stored second payload portions 368 is dependent upon the first wired communication protocol; however, the stored second payload portions 368 can have the same number of bits as their corresponding first payload portions 366. The parallel output data stream 370 represents multiple data packets having second header portions and second payload portions that are defined in accordance with the first wired communication protocol. Thereafter, the encapsulating module 324 generates and appends the second header portions to their corresponding second payload portions according to the first wired communication protocol to provide the parallel output data stream 370.

The fourth SerDes module 326 can convert the parallel output data stream 370 into a serial data stream to provide the serial output data stream 372.

The clocking module 306 provides a common reference clock or clocking source to ensure that the serial output data stream 360 and other serial output data streams provided by other mapper PHYs are sufficiently aligned to satisfy frame timing alignment accuracy requirements of a wireless communication protocol, such as the 3GPP communication protocol, the WiMAX communication protocol, the LTE communication protocol, the GSM communication protocol to provide some examples. In this exemplary embodiment, the clocking module 306 synchronizes the serial output data stream 360 to a Time of Day (ToD) reference as provided by I.E.E.E. 1588; however, those skilled in the relevant art(s) will recognize that other manners of synchronization are possible without departing from the spirit and scope of the present disclosure. The clocking module 306 includes a timestamper module 328, a reference generator module 330, and a timing generator module 332.

The timestamper module 328 receives an analog input clocking signal 374 that is provided and/or formatted in accordance with a Precision Time Protocol (PTP), such as the ToD reference as provided by I.E.E.E. 1588 to provide an example. The ToD reference as provided by I.E.E.E. 1588 is often comprised of a 48 bit seconds value and a 32 bit nanoseconds value. The mapper PHY 300 aligns frames of the second wired communication protocol so that a frame of the second wired communication protocol is aligned to intervals of the ToD reference. For example, the mapper PHY 300 aligns CPRI frames so that a CPRI HyperFrame, occurring at a rate of 15 kHz is aligned to 666666. 6666 . . . ns multiples of the ToD, and/or a CPRI RadioFrame, occurring at a rate of 100 Hz, is aligned to 10 ms multiples of the ToD reference. In an exemplary embodiment, the mapper PHY 300 is implemented as part of a larger electronic system with other mapper PHYs. In this exemplary embodiment, the analog input clocking signal 374 is received from a master, or common, clocking reference, such as the reference module 218 to provide an example, which operates as a master, or common, reference clock for this larger electronic system. The timestamper module 328 includes a time-to-digital converter that converts the analog input clocking signal 374 into a digital output clocking signal. In an exemplary embodiment, the timestamper module 328 can include a numerically controlled oscillator (NCO) to perform this time-to-digital conversion.

The timestamper module 328 then compares this digital output clocking signal to one or more framing clocks 376 to determine a timing error signal 378 representing a relative difference between the digital output clocking signal and the one or more framing clocks 376. In an exemplary embodiment, the timing error 378 represents a deviation between the ToD reference and nominal timing for the CPRI HyperFrame and/or the CPRI RadioFrame. In exemplary embodiment, the one or more framing clocks 376 include a first framing clock that can be used by the first framing module 314 to frame the first payload portions 356 and their corresponding header portions into the CPRI HyperFrame and/or a second framing clock that can be used by the first framing module 314 to frame the first payload portions 356 and their corresponding header portions into the CPRI RadioFrame. In another exemplary embodiment, the timestamper module 328 compares the digital output clocking signal and the one or more framing clocks 376 at a start of the CPRI HyperFrame and/or the CPRI RadioFrame to determine their relative difference.

Alternatively, or in addition to, the timestamper module 328 can observe read and/or write pointers 384 that are used by the first buffering module 312 for writing of the first payload portions 354 into corresponding the addresses of the first buffering module 312 and/or reading of the stored first payload portions 356 from their corresponding the addresses of the first buffering module 312. When the first buffering module 312 is sufficiently synchronized to the ToD, the read and/or write pointers 384 should point an address of 0 at the start of each data packet of the parallel output data stream 358. In an exemplary embodiment, the read pointers from among the read and/or write pointers 384 are decoupled from the write pointers from among the read and/or write pointers 384. In this exemplary embodiment, the write pointers are determined by the index, i.e., position, of the first payload portions 354 within the parallel input data stream 352 based upon the first header portions and the read pointers are determined based upon the ToD reference by the timestamper module 328.

The reference generator module 330 provides a sampling clock 380 for use by the second SerDes module 316 to convert the parallel output data stream 358 into the serial data stream 360 and/or the third SerDes module 318 to convert the serial input data stream 362 into the parallel input data stream 364. The reference generator module 330 can include a phase locked loop (PLL), or other similar control mechanism that will be apparent to those skilled in the relevant art(s), to provide the sampling clock 380. This PLL or other similar control mechanism can adjust one or more characteristics, such as a frequency and/or a phase to provide some examples, of the sampling clock 380 in response to the timing error signal 378. Because the timestamper module 328, the reference generator module 330, and the timing generator module 332 are configured in a closed loop arrangement, the adjustment of the one or more characteristics will lessen the timing error signal 378 for each iteration.

The timing generator module 332 provides a framing clock 382 to be used by the first framing module 314 to frame the stored first payload portions 356 and their corresponding header portions into the parallel output data stream 358 in accordance with the second wired communication protocol. In exemplary embodiment, the framing clock 382 is used to frame the stored first payload portions 356 and their corresponding header portions into the CPRI Hyper-Frame or the CPRI RadioFrame. The timing generator module 332 may, optionally, frequency translate the sampling clock 380 to provide the one or more framing clocks 376 and can select one of the one or more framing clocks 376 as the framing clock 382.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

It will be apparent to those skilled in the relevant art(s) that various changes in form and detail can be made therein without departing from the spirit and scope of the disclosure. Thus the present disclosure should not be limited by any of the above-described exemplary embodiments, but should be defined only in accordance with the following claims and their equivalents.

What is claimed is:

1. A mapper physical layer device (PHY), comprising:
a transmission module configured to perform a first protocol conversion of a serial input data stream that is formatted according to a first wired communication protocol to provide a serial output data stream that is formatted according to a second wired communication protocol, the transmission module including:
a first Serializer/Deserializer (SerDes) module configured to convert the serial input data stream into a parallel data stream to provide a parallel input data stream,
a decapsulating module configured to separate the parallel input data stream into a first payload portion and a first header portion and to store the first payload portion into a corresponding address of a buffering module,
a framing module configured to read the stored first payload portion from the buffering module using the corresponding address to provide a second payload portion and to append a second header portion of the second wired communication protocol to the second payload portion to provide a parallel output data stream, and
a second SerDes module configured to convert the parallel output data stream into a serial data stream to provide the serial output data stream; and
a clocking module configured to synchronize the serial output data stream to a Time of Day (ToD) reference.

2. The mapper PHY of claim 1, wherein the corresponding address of the buffering module is based on a position of the first payload portion in the serial input data stream as determined by the first header portion.

3. The mapper PHY of claim 1, wherein the framing module is further configured to:
read a frame of the stored first payload portion from the buffering module using the corresponding address of the buffering module to provide the second payload portion, and
generate the second header portion corresponding to the second payload portion in accordance with the second wired communication protocol.

4. The mapper PHY of claim 3, wherein the frame is formatted in accordance with the second wired communication protocol.

5. The mapper PHY of claim 1, wherein the first wired communication protocol comprises:
an Ethernet communication protocol, and
wherein the second wired communication protocol comprises:
a Common Public Radio Interface (CPRI) communication protocol.

6. The mapper PHY of claim 1, wherein the clocking module is further configured to:
provide a framing clock to the transmission module to perform the first protocol conversion, and
adjust a sampling clock to synchronize the serial output data stream to the ToD reference.

7. The mapper PHY of claim 1, further comprising:
a reception module configured to perform a second protocol conversion of a second serial input data stream that is formatted according to the second wired communication protocol to provide a second serial output data stream that is formatted according to the first wired communication protocol.

8. A mapper physical layer device (PHY), comprising:
a first Serializer/Deserializer (SerDes) module configured to convert a serial input data stream that is formatted according to a first wired communication protocol into a parallel data stream to provide a parallel input data stream;
a decapsulating module configured to separate the parallel input data stream into a first payload portion and a first header portion and to store the first payload portion into a corresponding address of a buffering module;
a framing module configured to:
read a frame of the stored first payload portion from the buffering module using the corresponding address of the buffering module to provide a second payload portion,
generate a second header portion corresponding to the second payload portion in accordance with a second wired communication protocol, and
append the second header portion to the second payload portion to provide a parallel output data stream;
a second SerDes module configured to convert the parallel output data stream from parallel to serial to provide a serial output data stream; and a clocking module configured to synchronize the serial output data stream with other serial data streams from other PHY devices.

9. The mapper PHY of claim 8, wherein the frame is formatted in accordance with the second wired communication protocol.

10. The mapper PHY of claim 8, wherein the first wired communication protocol comprises:
   an Ethernet communication protocol, and
   wherein the second wired communication protocol comprises:
      a Common Public Radio Interface (CPRI) communication protocol.

11. The mapper PHY of claim 8, wherein the corresponding address of the buffering module is based on a position of the first payload portion in the serial input data stream as determined by the first header portion.

12. A mapper physical layer device (PHY), comprising:
   a first Serializer/Deserializer (SerDes) module configured to convert a serial input data stream that is formatted according to a first wired communication protocol into a parallel data stream to provide a parallel input data stream;
   a decapsulating module configured to separate the parallel input data stream into a first payload portion and a first header portion and to store the first payload portion into a corresponding address of a buffering module;
   a framing module configured to read the stored first payload portion from the buffering module using the corresponding address to provide a second payload portion and to append a second header portion of a second wired communication protocol to the second payload portion to provide a parallel output data stream; and
   a second SerDes module configured to convert the parallel output data stream into a serial data stream to provide a serial output data stream that is formatted according to the second wired communication protocol.

13. The mapper PHY of claim 12, wherein the corresponding address of the buffering module is based on a position of the first payload portion in the serial input data stream as determined by the first header portion.

14. The mapper PHY of claim 12, wherein the framing module is further configured to:
   read a frame of the stored first payload portion from the buffering module using the corresponding address of the buffering module to provide the second payload portion, and
   generate the second header portion corresponding to the second payload portion in accordance with the second wired communication protocol.

15. The mapper PHY of claim 14, wherein the frame is formatted in accordance with the second wired communication protocol.

16. The mapper PHY of claim 12, wherein the first wired communication protocol comprises:
   an Ethernet communication protocol, and
   wherein the second wired communication protocol comprises:
      a Common Public Radio Interface (CPRI) communication protocol.

17. The mapper PHY of claim 12, further comprising:
   a clocking module configured to distribute a clocking source to the mapper PHY and a second mapper PHY and to synchronize the serial output data stream to the clocking source.

18. The mapper PHY of claim 17, wherein the clocking source comprises:
   a Time of Day (ToD) reference as provided by a Precision Time Protocol (PTP).

19. The mapper PHY of claim 18, wherein the PTP comprises:
   a version of Institute of Electrical and Electronics Engineers (I.E.E.E.) 1588.

20. The mapper PHY of claim 17, wherein the clocking module is configured to synchronize the serial output data stream to the clocking source to ensure the serial output data and a second serial output data stream provided by the second mapper PHYs are sufficiently aligned to satisfy frame timing alignment accuracy requirements of a wireless communication protocol.

21. The mapper PHY of claim 20, wherein the wireless communication protocol comprises:
   a Third Generation Partnership Project (3GPP) communication protocol;
   a Worldwide Interoperability for Microwave Access (WiMAX) communication protocol;
   a Long-Term Evolution (LTE) communication protocol; or
   a Global System for Mobile Communications (GSM) communication protocol.

* * * * *